(12) United States Patent
Malkin et al.

(10) Patent No.: US 7,324,959 B2
(45) Date of Patent: Jan. 29, 2008

(54) METHOD FOR DELIVERING INFORMATION BASED ON RELATIVE SPATIAL POSITION

(75) Inventors: Peter K. Malkin, Arsdley, NY (US); Jonathan H. Connell, Cortlandt Manor, NY (US); Wendy Anne Kellogg, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1134 days.

(21) Appl. No.: 09/900,334

(22) Filed: Jul. 6, 2001

(65) Prior Publication Data

US 2003/0009394 A1 Jan. 9, 2003

(51) Int. Cl.
*G06Q 20/00* (2006.01)
(52) U.S. Cl. .......................... 705/16; 705/26
(58) Field of Classification Search .......... 705/16, 705/26, 27
See application file for complete search history.

(56) References Cited

U.S. PATENT DOCUMENTS

| | | | |
|---|---|---|---|
| 6,405,049 B2* | 6/2002 | Herrod et al. ............... | 455/517 |
| 6,542,824 B1* | 4/2003 | Berstis ........................ | 701/220 |
| 2002/0055872 A1* | 5/2002 | LaBrie et al. ................ | 705/14 |
| 2002/0082931 A1* | 6/2002 | Siegel et al. ................. | 705/26 |
| 2002/0087392 A1* | 7/2002 | Stevens ....................... | 705/10 |
| 2002/0102966 A1* | 8/2002 | Lev et al. .................... | 455/412 |
| 2002/0167916 A1* | 11/2002 | Clapper ....................... | 370/312 |
| 2002/0174025 A1* | 11/2002 | Hind et al. ................... | 705/26 |
| 2002/0184331 A1* | 12/2002 | Blight et al. ................. | 709/217 |
| 2002/0184332 A1* | 12/2002 | Kindberg et al. ........... | 709/217 |
| 2002/0194303 A1* | 12/2002 | Sulla et al. .................. | 709/218 |
| 2002/0194498 A1* | 12/2002 | Blight et al. ................. | 713/201 |

OTHER PUBLICATIONS

George W. Fitzmaurice "Situated Information Spaces And Spatially Aware Palmtop Computers," Communications of the ACM, Jul. 1995 vol. 36 No. 7, pp. 39-49.
H. R. Everett "Sensors For Mobile Robots," Feb. 1995, pp. 147-152.

* cited by examiner

*Primary Examiner*—Ronald Laneau
(74) *Attorney, Agent, or Firm*—F. Chau & Associates, LLC

(57) ABSTRACT

A method for providing product information comprises establishing a local reference frame which defines a space including a product identifier and a portable display device, receiving a request for product information corresponding to the product identifier from the portable display device, determining a position of the portable display device in relation to the local reference frame, and providing the product information via the portable display device according to the position of the portable display device.

20 Claims, 11 Drawing Sheets

METHOD FOR DELIVERING INFORMATION BASED ON RELATIVE SPATIAL POSITION

BACKGROUND OF THE INVENTION

1. Field of the Invention

The present invention relates to a method of retrieving product information, and more particularly to retrieving product information via a spatially-sensitive system including a portable display device.

2. Discussion of the Prior Art

While retail stores offer the convenience of nearly instantaneous delivery, if a customer can not find what he or she is looking for, a sale may be lost. Determining whether a store carries a particular item (or class of items) and getting directions for how to find the item in the store may improve the likelihood of making a sale. Moreover, seeing an item can often tip the balance and lead to additional impulse sales.

Even if the customer can locate the item or category of a desirable product, the customer may be unsure whether to make a purchase due to cost, suitability for a particular application, confusion generated by a plethora of choices, etc. Typically, the role of a sales associate is to help the customer make an informed purchase and nudge the customer into commitment if the customer is wavering. However, hiring knowledgeable retail employees can be difficult.

Many devices exhibit forms of spatial-sensitivity, for instance, global positioning system (GPS) devices determine a user's location to within a few yards. Other examples include interfaces to virtual reality environments which determine and display a virtual position in a computer generated environment, metrology devices for creating computer models from physical artifacts, tracking devices for monitoring vehicles (e.g., Lojack®), and various traffic monitoring systems (both pedestrian and vehicular). These systems are used merely to determine a global position and lack the capability to relate multimedia information to a consumer. Further, a number of these systems may not work indoors due to weak communications channels.

Systems such as cell phones, personal digital assistants (PDAs), and laptop computers have the ability to perform more complex tasks. However, these devices typically have no spatial sensitivity other than for establishing a connection to resources such as a specific computer local area network (LAN) or a telephone calling area (or specific cell tower). These systems do not provide precise positional information and may lack multimedia capabilities.

Fitzmaurice's Chameleon device is an example of a system which provides information, however, it is used primarily to provide a graphical information overlay on a view of the real world, or as a window through which spatially registered images are viewed. The system is described in "Situated Information Spaces and Spatially Aware Palmtop Computers", George W. Fitzmaurice, *Communications of the ACM*, Vol. 36, No. 7, pp. 39-49, July 1993.

Therefore, a need exists for a method of providing a customer personal access to multimedia information about product in real time.

SUMMARY OF THE INVENTION

According to an embodiment of the present invention, a method for providing product information comprises establishing a local reference frame which defines a space including a product identifier and a portable display device, receiving a request for product information corresponding to the product identifier from the portable display device, determining a position of the portable display device in relation to the local reference frame, and providing the product information via the portable display device according to the position of the portable display device.

The method includes receiving an order for a product corresponding to the product identifier from the portable display device. The method includes receiving a bid for a product corresponding to the product identifier using the portable display device. The method comprises the step of adding a product corresponding to the product identifier to a user shopping list using the portable display device. The method includes providing a menu for distinguishing a plurality of products in the space via the portable display device. The method further includes the step of redirecting a user toward an alternative product using the portable display device.

The method further comprises determining the orientation of the portable display device, and selecting between the object and another proximate object on the basis of the orientation of the portable display device.

The local reference frame is established using an active beacon. The method includes determining a position of the portable display device by comparing one of signal strengths of at least two beacons, a signal transmission time from each of at least two beacons, and an angle between at least two beacons.

The local reference frame is established using passive environmental markings. The method comprises determining a position of the portable display device relative to at least one environmental marking. The method includes the step of determining a position of the portable display device relative to an angle between at least two environmental markings.

The method retrieves the product information from a database stored in the portable display device.

The local reference frame is established relative to the portable display device and moves with the portable display device.

According to an embodiment of the present invention, a system for providing a user access to information comprises a portable display device within a local reference frame including an object, a plurality of positional sensors, a correlation means for determining the object according to a known position of the object within the local reference frame, and the position of the portable display device, and a database for providing, via the portable display device, information corresponding to the object.

The system further comprises a plurality of active beacons defining the local reference frame, wherein the positional sensors are part of the portable display device.

The correlation means determines the position of the portable display device based on a signal strength of at least one active beacon, wherein the signal strength is determined by the positional sensors. The correlation means determines the position of the portable display device is based on a signal transmission times from each of at least two active beacons.

The system comprises a wireless communication link between the portable display device and a database of product information.

According to an embodiment of the present invention, a program storage device is provided readable by machine, tangibly embodying a program of instructions executable by the machine to perform method steps for providing product information, the method includes establishing a local reference frame which defines a space including a product identifier and a portable display device, receiving a request for product information corresponding to the product identifier from the portable display device, determining a position of the portable display device in relation to the local reference frame, and providing the product information via the portable display device according to the position of the portable display device.

BRIEF DESCRIPTION OF THE FIGURES

Preferred embodiments of the present invention will be described below in more detail, with reference to the accompanying drawings.

DETAILED DESCRIPTION OF PREFERRED EMBODIMENTS

According to an embodiment of the present invention a local coordinate system is established within an area such as a store or showroom. A customer within the area are provided with a spatially sensitive portable display device, for example a personal digital assistant (PDA). The portable display device determines its position within the local coordinate system. Depending on the user's position and the orientation of the portable display device, product information relevant to the position or spatial location of the portable display device can presented to the customer. For example, which products proximate to the personal display device, for example, within a children's clothing department of a store, are on sale. Such a system may be provided as a service to one or more businesses within the area. The present invention may be implemented in many contexts, for example, indoors on a sales floor, outdoors at an automobile dealership, and in non-commercial spaces such as a museum.

Figure 1:
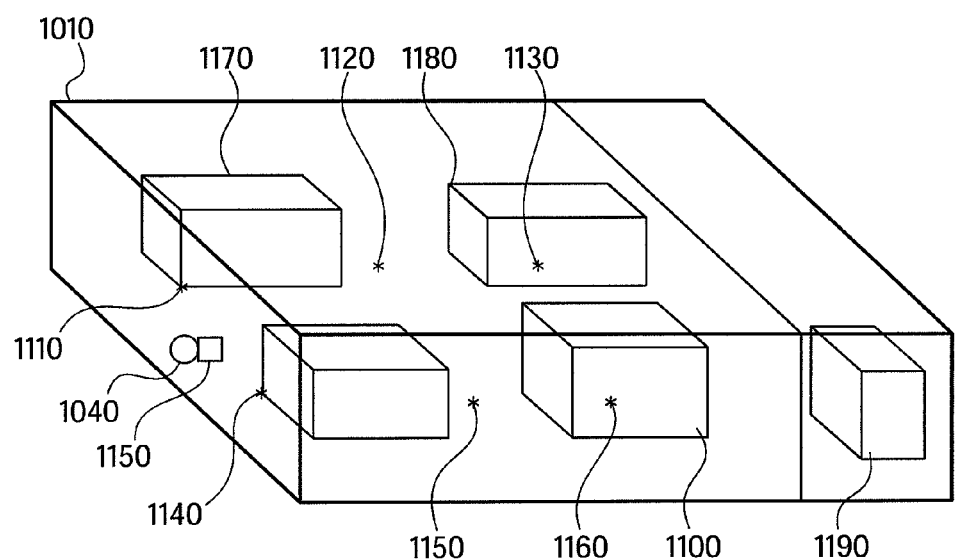
FIG. 1 is a diagram of an beacon-instrumented store according to an embodiment of the present invention.

Referring to FIG. 1, a sales floor 1010 is shown, including a customer 1040 carrying a portable display device 1050. The sales floor includes active beacons 1110-1160 and display cases 1170, 1180, and 1100. The active beacons can include, inter alia, radio frequency, ultrasonic, and infrared beacons. A store database server 1190 is provided including information related to goods and/or services provided by a business or vendors on the sales floor. The customer 1040 can access the database server 1190 via the portable display device and a wireless link (e.g., including, but not limited to those supported by IEEE standards 802.11a and 802.11b, and developing standard 802.11g). Platforms able to provide the services for the store database server 1190 include, but are not limited to, IBM's DB/2 database server running on one of IBM's 390 or RS/6000 computer systems. Other systems would be obvious to one skilled in the art.

Alternatively, the user may have already downloaded the complete store database into his portable display device. If this is the case, and the device is able to determine its position without help from an external system, then there is no need for a wireless link. The determined position can be used to look up information already resident in the display device.

Figure 2:
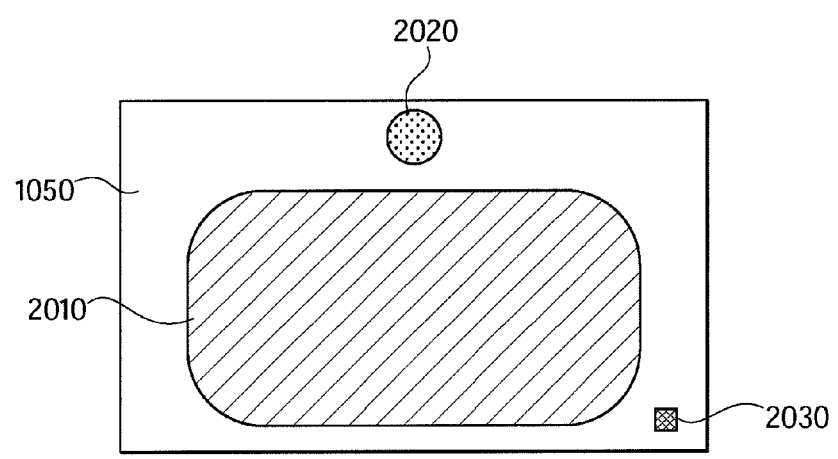
FIG. 2 is an example of the external architecture of a single-sensor portable display device according to an embodiment of the present invention.
Figure 3:
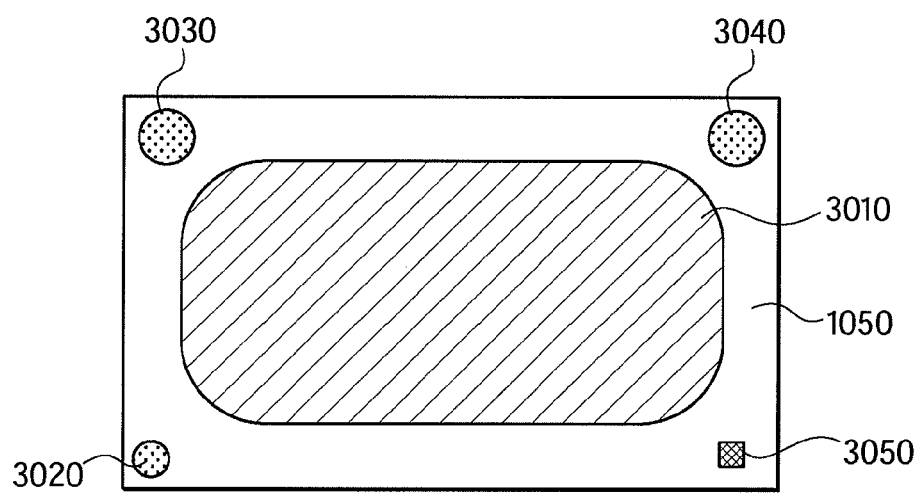
FIG. 3 is an example of the external architecture of a triple-sensor portable display device exterior according to an embodiment of the present invention.

FIGS. 2 and 3 depict examples of the external architecture of portable display devices according to the present invention. FIG. 2 shows an example of a portable display device 1050 equipped with a display 2010, a trigger button 2030, and a sensor 2020. FIG. 3 shows a portable display device 1050 equipped with a display 3010, a trigger button 3050, and three sensors 3020, 3030, and 3040. The additional sensors can be used to obtain the orientation of the display device, or to make the position determination process more robust. Those with regular skill in the art will appreciate that other configurations are possible in view of the present invention.

According to an embodiment of the present invention, a touch sensitive screen is provided, for example as used by Palm™ handheld computers. Further, a keypad and/or bar-code scanner may be provided for data input. Such interfaces would allow customers to provide input in addition to the triggering impulse provided by the triggering buttons 2030 and 3050. This input can be used to request additional types of information, to complete the purchase of an item, or to request directions to some related item.

Figure 4:
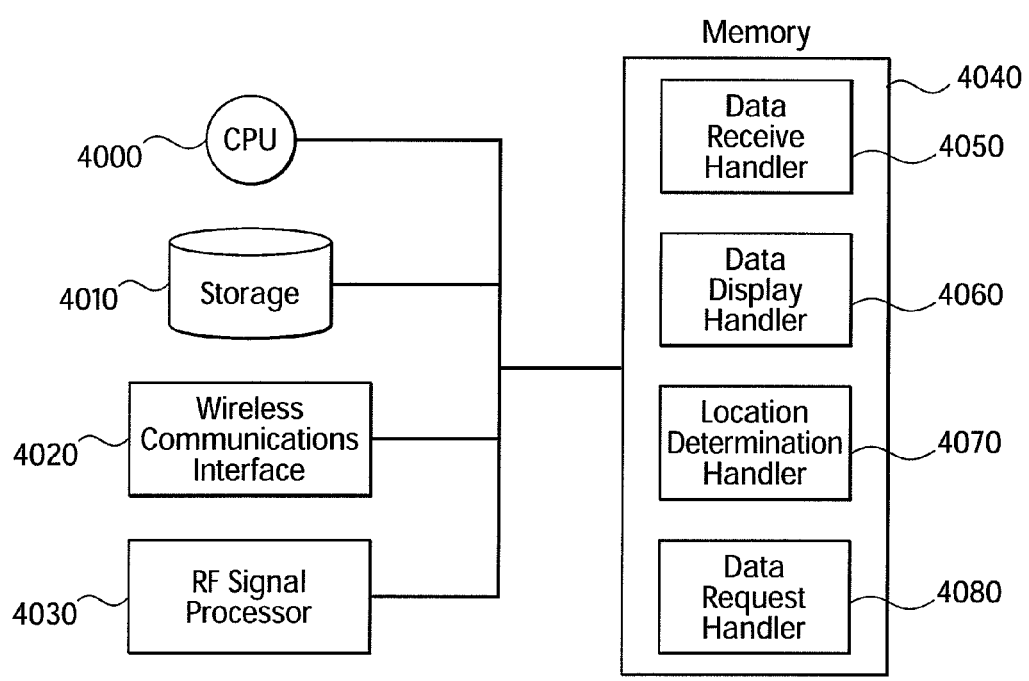
FIG. 4 is an illustrative block diagram of a PDA's internal architecture according to an embodiment of the present invention.

FIG. 4 shows an example of the internal architecture of the portable display device 1050 applicable to the present invention. The portable display device includes, inter alia: a central processing unit (CPU) 4000; a storage means 4010 (e.g., programmable nonvolatile RAM); a wireless communications interface (e.g., including, but not limited to those supported by IEEE standards 802.11a and 802.11b, and developing standard 802.11g) 4020 through which the portable display device can communicate with other network devices (e.g., the store's product database); a Signal Processor 4030 for interacting with the sensors; and a memory 4040. The memory 4040 includes, as executable binary code, inter alia: a Data Receive Handler 4050; a Data Display Handler 4060; a Location Determination Handler 4070; and a Data Request Handler 4080.

Figure 5:
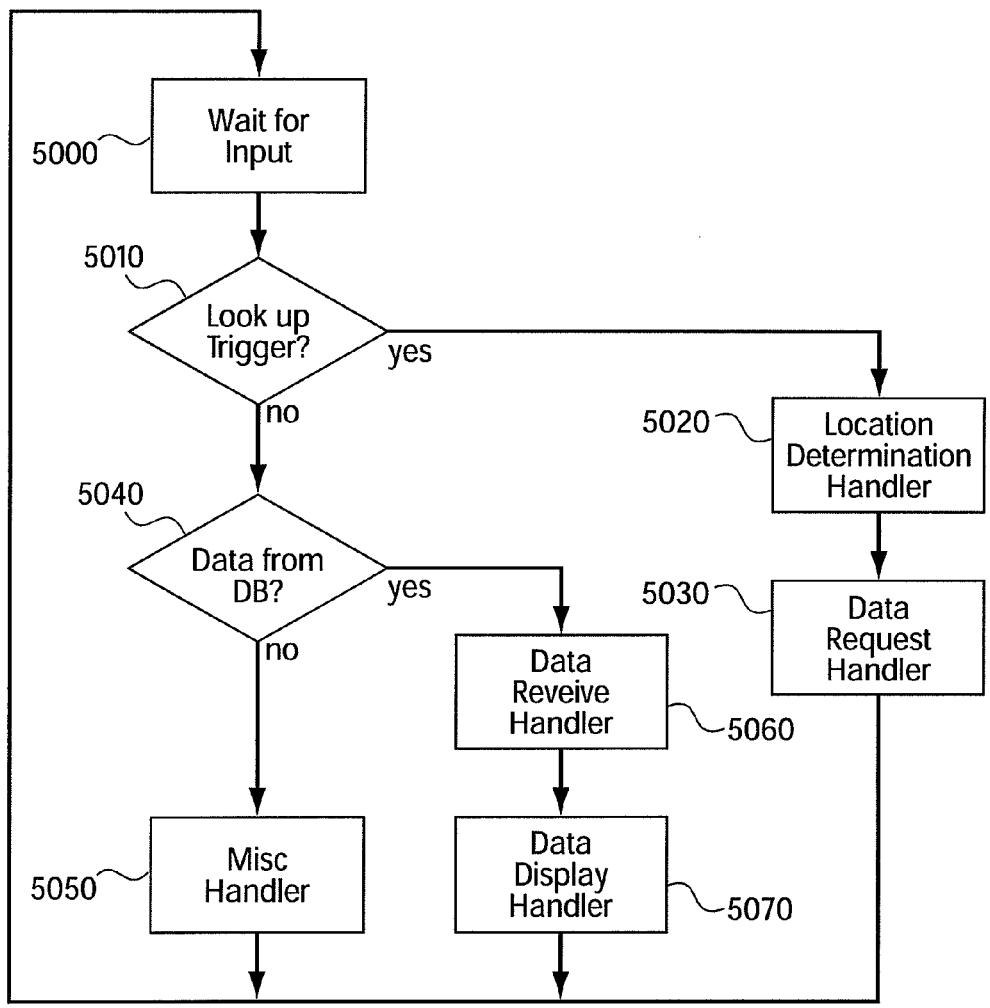
FIG. 5 is an illustrative block diagram of a PDA's logic according to an embodiment of the present invention.

FIG. 5 depicts an example of the portable display device's logic. In block 5000, the portable display device waits for input and, when received, checks the type of input in block 5010. The portable display device first determines whether the input was a trigger request, signaled by the user pressing the trigger button. Upon determining that an input trigger request has arrived, the portable display device invokes its Location Determination Handler 5020 to determine its current position within the area (e.g., the store). Next, the portable display device invokes the Data Request Handler 5030 to request data relevant to its current location from the Store Database Server; control then continues at block 5000.

If the input was not a trigger request; the portable display device checks if data is being returned 5040 by the Store Database Server 1190. This typically happens in response to a previous user request. However, data might also be sent spontaneously based on the user's current position either as a navigational aid, or as a location-specific advertisement feed. Upon detecting the arrival of data from the Store Database Server 1190, Server, the portable display device invokes its Data Receive Handler 5060 to pull in all data being sent to it. The portable display device then invokes its Data Display Handler 5070 in order to the present the received data on its display. Finally control passes back to block 5000. If no such data is being received, a miscellaneous handler is instead invoked 5050, after which control continues directly at block 5000.

Figure 6:
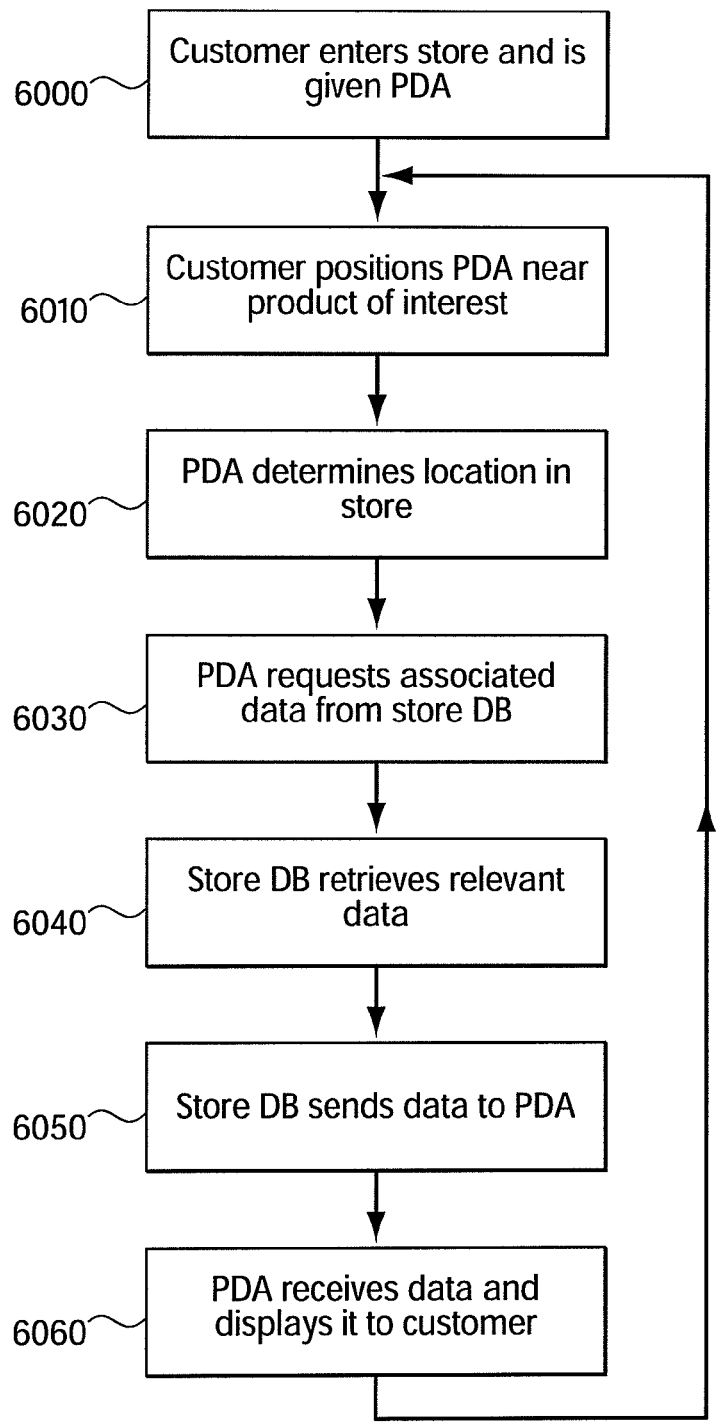
FIG. 6 is a flowchart showing the business process according to an embodiment of the present invention.

FIG. 6 indicates the overall business process of the present invention. In block 6000, the customer enters the store and is given a portable display device. Alternatively, the user may already own an appropriate device which he has brought with him. In block 6010, after finding an item of interest, the customer positions the portable display device near the item or points it toward the item. In block 6020, the portable display device then determines its location in the store, and in block 6030 sends a request to the store's database asking for information relevant to the portable display device's current location. Note that the portable display device can be equipped with a button that would allow the customer to indicate when the portable display device should send such requests. In block 6040, the store database retrieves all information relative to the specified location, and then sends it back to the portable display device in block 6050. In block 6060, the portable display device receives the relevant information from the store database and then displays it to the customer.

Figure 7:
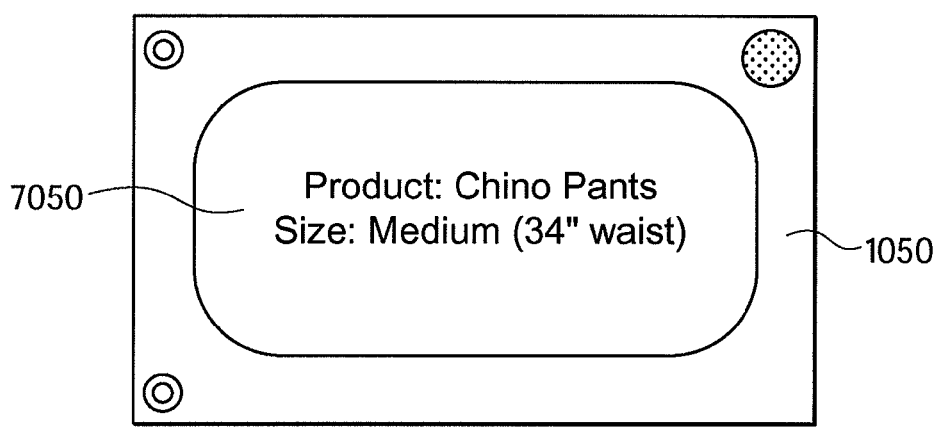
FIG. 7 is an example of data being displayed by a portable display device according to an embodiment of the present invention.

The product information can include, inter alia, sales information, promotional information and comparison information. By way of an illustrative example, and not by limitation, the portable display can automatically provide a customer in the printer section of a computer superstore with product reviews of the model he or she is proximate to (e.g., standing in front of). Other types of spatially-dependent data that might be presented include, inter alia, comparisons of similar items in the local area, price and inventory information about one or more models, or automated sales pitches for items on sale. Referring to FIG. 7, the portable display device 1050 can also display cross-referencing data, for example, the fact that the size of the selected pair of pants is "medium" and that this is equivalent to a 34 inch waist 7050.

In conjunction with additional user input, the device can also provide navigation directions from the current location to the vicinity of a selected item, allow the entering of a bid for a nearby item, request remote notification concerning the availability of an item, suggest a suitable substitute product, or place an order for specific merchandise.

There are various methods for determining the position of the portable display device in free-space. For example, several acoustic emitters and detectors (e.g., ultrasonic) can determine time-of-flight measurements along with a partially known emitter/detector geometry to establish the relative position and orientation of the portable display device. A similar method proposes the use of relative phase shift measurements of an acoustic or electromagnetic signal to estimate path lengths between various emitters and detectors. Such systems are described in Section 6.1 of "Sensors for Mobile Robots: Theory and Applications", H. R. Everett, A. K. Peters Inc., Wellesley Mass., 1995.

Figure 8:
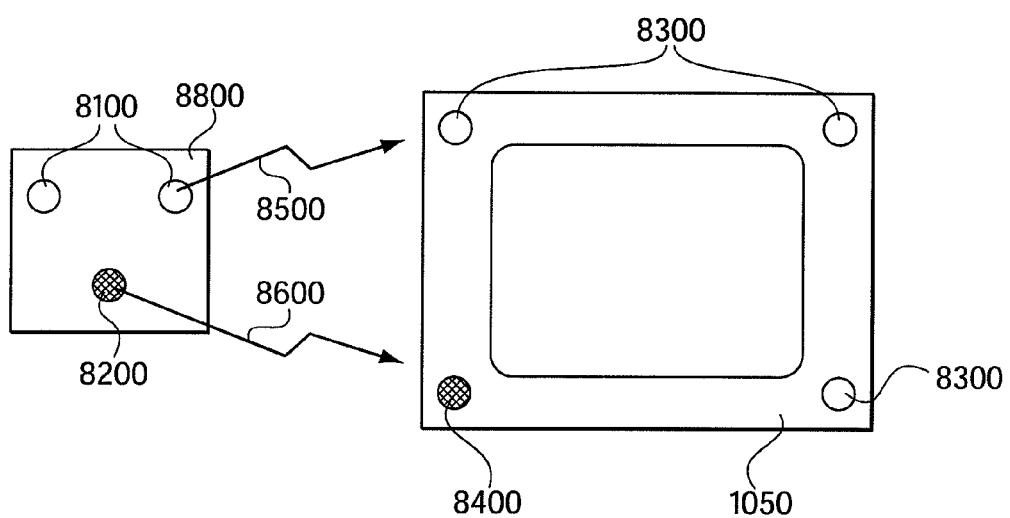
FIG. 8 shows an example of a time-of-flight-based location determining configuration according to an embodiment of the present invention.

FIG. 8 shows an example of a time-of-flight transponder-receiver configuration. Transponder 8800 includes an Infrared (IR) emitter 8200 and two ultrasonic (US) emitters 8100. At the same instant the transponder 8800 generates a burst of IR light 8600 and one or more pulses of US sound 8500. The pulse from the two emitters 8100 can be frequency coded so that their arrival times can be disambiguated. Alternatively, for every IR pulse first one then the other of the US emitters can be triggered. The portable device 1050 first receives the infrared pulse 8600 via its IR receiver 8400, then awaits the arrival of the ultrasonic pulses 8500 at its US receivers 8300. This provides 6 arrival times which correspond to the physical path lengths between the US receivers 8300 and the US emitters 8100. Such a system of length measurements can be solved to give three dimensions of spatial position and three rotation angles of the device 1050. These positions and rotations are relative to the local reference frame established by the transponder assembly 8800. Alternatively, the portable display device might emit an IR pulse which then triggers the transponder to generate its US pulses. This also yields a number of path lengths (signal transmission times) which can be combined to determine the device's position.

If only the position of the device is desired, then fewer receivers can be used. However, determining the device's orientation also allows the user to make finer positional discriminations by pointing the device. The location determination handler 4070 can take the (x, y, z) position of the device as a base point and then project a ray along the pointing direction as determined from the orientation of the device. The first object position that this ray intersects would then be chosen as the object selected by the user. This is a particularly useful mode when the object is out of convenient reach, such as being high up on a shelf.

Figure 9:
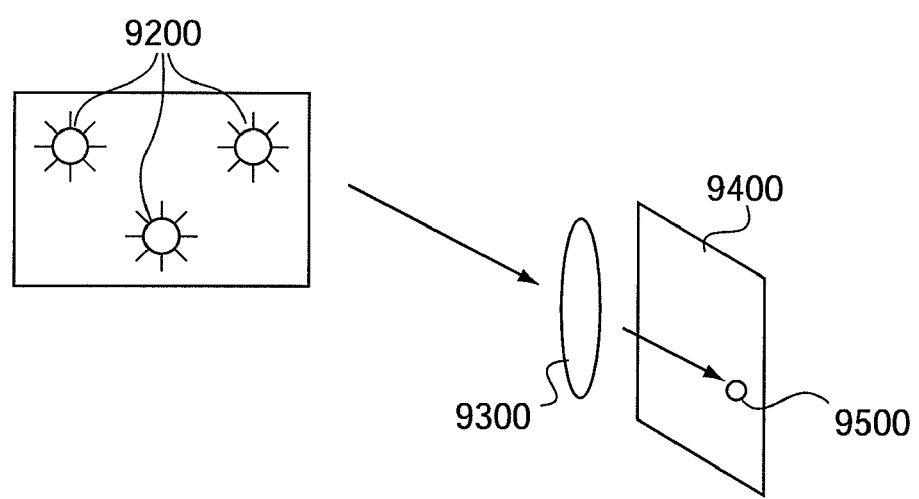
FIG. 9 shows an example of a image analysis-based location determining configuration according to an embodiment of the present invention.

Another possibility involves measuring the angles to a number of reference points and computing the device position based on this. The azimuth and elevation of several infrared LED beacons can be determined using, for example, a two-dimensional (2D) imaging system, a linear array sensor, or a mechanically scanned detector. FIG. 9 shows an example of such a 2D imaging system. Here there are three IR emitters 9200 that blink in a particular pattern, such as a clockwise rotation where only one is on at a time. The emitters are imaged through lens 9300 onto a position sensing light detector 9400, such as a quadrant photodetector (PSD) or a CCD (charge-coupled device) camera. The lens and detector are part of portable display device 1050. Each imaged point 9500 then yields an x and y image offset from the center of photodetector 9400. Combined with the focal length of lens 9300, each of these (x, y) measurements can be translated into a pair of angles corresponding to the direction toward the particular emitter 9200. If the true physical spacing between all the emitters 9200 is known, then the three sets of computed angles can be used to solve for the pose (i.e., position & orientation) of light detector 9400 and hence device 1050.

One with regular skill in the art will also see that the whole apparatus can be turned around. That is, the emitters can be part of portable display device 1050 while the light detector 9400 and lens 9300 are part of the store infrastructure. In this case the position determination would most likely be done by store database server 1190 (or some equivalent computer which is part of the store) instead of by portable display device 1050.

According to an embodiment of the present invention, an approximate position can also be established based on proximity to a particular reference. For example, the portable display device can determine its position according to which micro-cell a radio was operating in, the angular sector of one or more micro-cells, the code(s) associated with the strongest responding nearby beacon(s) 1110-1460, the reading of a barcode affixed to a pillar within the building, or even the reading of the barcode on a shelf or affixed directly to a product. According to the preferred embodiment, beacons 1110-1160 can be RF (radio frequency) emitters. The portable display device would then use sensor 2020 and Signal Processor 4030 to determine the signal strengths of the RF beacon(s). The strength of such a signal is related by the inverse square law to the distance between the beacon and the portable display device. Thus, the strongest beacon among a group of beacons can be determined to be the most proximate beacon. If signals from two or more beacons were received, a position somewhere in between them can be interpolated based on the known signal propagation characteristics.

Figure 10:
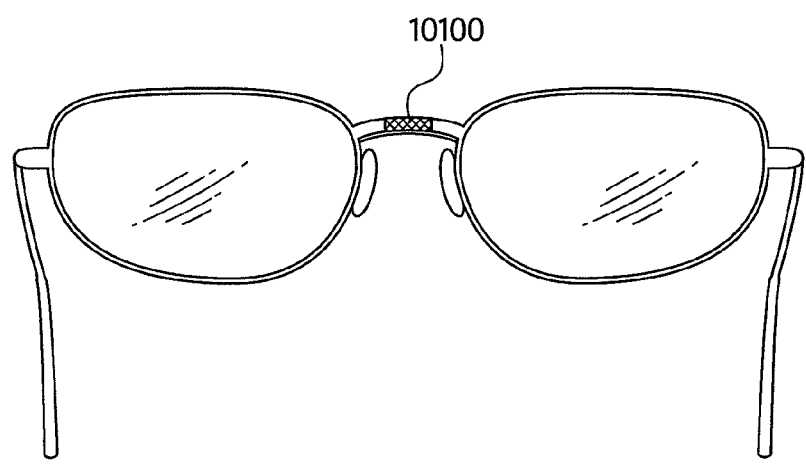
FIG. 10 shows an example of a single customer-carried reference pattern according to an embodiment of the present invention.
Figure 11:
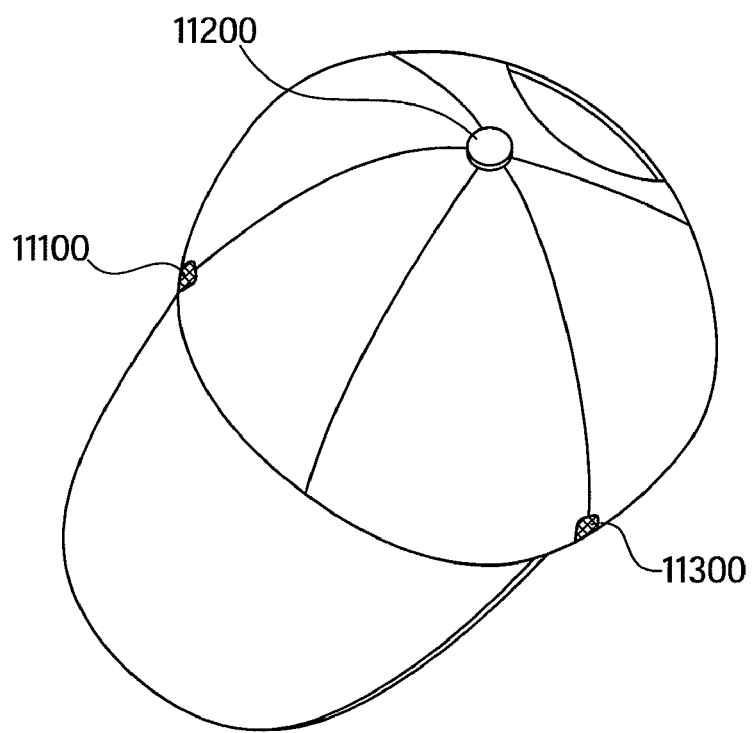
FIG. 11 shows an example of a customer with multiple reference emitters according to an embodiment of the present invention.

One with regular skill in the art will appreciate that the portable display device can be outfitted to serve as a reference coordinate frame, either solely or in conjunction with the store's reference frame. Examples of this are shown in FIGS. 10 and 11. The portable display device can determine the customer's location relative to itself. Given this additional relative positioning information, the portable display device 1050 can allow the user to choose which aspect of a given selected item is displayed. For example, the customer might point her portable display device at a particular dress. By holding the portable display device farther away from herself, she can have the device display suggestions of shoes that will match, while by holding the device closer, she can have it show size cross-referencing information.

FIG. 10 shows an example where a passive marking 10100 is placed on a portion of the user (his glasses) to serve as a reference point. A camera on the portable display device can be used to measure the size, rotation, and skew of this marking to determine the position and rotation of the device relative to the user. This is equivalent to detecting several distinguished points within the marking and then determining the angles to these points (as was described in the discussion of FIG. 9). Alternatively, intrinsic features of the user such as the centers of his eyes and the tip of his nose can be used as reference points without requiring the addition of an explicit marking. A camera can once again be used to detect these features and measure the attributes of their projected configuration. If the true size of the user's face is known, this system of measurements can again be inverted to yield the pose of the portable display device. A similar system using either intentional passive markings or intrinsic environmental features can also be used to establish the local reference frame for the whole store.

FIG. 11 shows another example where the customer dons a hat equipped with three active emitters, 11100-11300. These emitters can be tracked by the store system using a number of ceiling mounted cameras to determine the position of the customer within the store. Different hats might blink at different rates or emit different pulse trains so that individual customers can be distinguished. However, these emitters can be tracked independently by the portable display device to determine the device's position and orientation locally with respect to the user.

Note that either the device's sensors or the user's emitters can form the basis of the local reference frame. Determining the device's position relative to the emitters is equivalent to determining the emitter's position relative to the device.

Having described embodiments of a method for retrieving data using a spatially sensitive personal data assistant, it is noted that in light of the above teachings modifications and variations can be made by persons skilled in the art. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims:

1. A method for providing product information comprising the steps of:
   establishing a local reference frame which defines a space including a product identifier corresponding to the product information and a portable display device, wherein the space is three dimensional;
   receiving a request for product information corresponding to the product identifier from the portable display device;
   determining a position and an orientation in the three dimensional space of the portable display device in relation to the local reference frame;
   requesting via the portable display device the product information, wherein the product identifier corresponding to the product information is selected according to the position and the orientation in the three dimensional space of the portable display device in relation to the local reference frame; and
   providing the product information via the portable display device.

2. The method of claim 1, further comprising the step receiving an order for a product corresponding to the product identifier from the portable display device.

3. The method of claim 1, further comprising the step of receiving a bid for a product corresponding to the product identifier from the portable display device.

4. The method of claim 1, further comprising the step of adding a product corresponding to the product identifier to a user shopping list using the portable display device.

5. The method of claim 1, further comprising the step of providing a menu for distinguishing a plurality of products in the space via the portable display device.

6. The method of claim 1, further comprising the step of redirecting a user toward an alternative product using the portable display device.

7. The method of claim 1, further comprising the steps of:
   determining the orientation of the portable display device; and
   selecting between the object and another proximate object on the basis of the orientation of the portable display device.

8. The method of claim 1, wherein the local reference frame is established using an active beacon.

9. The method of claim 8, further comprising the step of determining a position of the portable display device by comparing one of signal strengths of at least two beacons, a signal transmission time from each of at least two beacons, and an angle between at least two beacons, and the orientation is determined in three rotation angles.

10. The method of claim 1, wherein the local reference frame is established using passive environmental markings.

11. The method of claim 10, further comprising the step of determining a position of the portable display device relative to at least one environmental marking.

12. The method of claim 10, further comprising the step of determining a position of the portable display device relative to an angle between at least two environmental markings.

13. The method of claim 1, further comprising the step of retrieving the product information from a database stored in the portable display device.

14. The method of claim 1, wherein the local reference frame is established relative to the portable display device and moves with the portable display device.

15. A system for providing a user access to information comprising:
- a portable display device within a local reference frame including an object, wherein the local reference frame is a three dimensional space;
- a plurality of positional sensors;
- a user selectable trigger of the portable display device for triggering a correlation means, the correlation means for determining the object according to a known position of the object within the three dimensional space, and a position and an orientation of the portable display device within the three dimensional space; and
- a database for providing, via the portable display device, information corresponding to the object.

16. The system of claim 15, further comprising a plurality of active beacons defining the local reference frame, wherein the positional sensors are part of the portable display device.

17. The system of claim 15, wherein the correlation means determines the position of the portable display device based on a signal strength of at least one active beacon, wherein the signal strength is determined by the positional sensors.

18. The system of claim 15, where the correlation means determines the position of the portable display device is based on a signal transmission times from each of at least two active beacons, and the orientation is determined in three rotation angles.

19. The system of claim 15, further comprising a wireless communication link between the portable display device and a database of product information.

20. A program storage device readable by machine, tangibly embodying a program of instructions executable by the machine to perform method steps for providing product information, the method steps comprising:
- establishing a local reference frame which defines a space including a product identifier corresponding to the product information and a portable display device, wherein the space is three dimensional;
- receiving a request for product information corresponding to the product identifier from the portable display device;
- determining a position and an orientation in the three dimensional space of the portable display device in relation to the local reference frame;
- requesting via the portable display device the product information, wherein the product identifier corresponding to the product information is selected according to the position and the orientation in the three dimensional space of the portable display device in relation to the local reference frame; and
- providing the product information via the portable display device.

* * * * *